United States Patent
Kwon et al.

(10) Patent No.: US 12,006,390 B2
(45) Date of Patent: Jun. 11, 2024

(54) LATEX COMPOSITION FOR DIP MOLDING, DIP-MOLDED PRODUCT COMPRISING SAME, AND METHOD FOR MANUFACTURING DIP-MOLDED PRODUCT BY USING SAME

(71) Applicant: LG Chem, Ltd., Seoul (KR)

(72) Inventors: Won Sang Kwon, Daejeon (KR); Tae Shik Yoon, Daejeon (KR); Jung Su Han, Daejeon (KR); Myung Su Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 437 days.

(21) Appl. No.: 17/421,822

(22) PCT Filed: Aug. 12, 2020

(86) PCT No.: PCT/KR2020/010658
§ 371 (c)(1),
(2) Date: Jul. 9, 2021

(87) PCT Pub. No.: WO2021/066317
PCT Pub. Date: Apr. 8, 2021

(65) Prior Publication Data
US 2022/0098351 A1    Mar. 31, 2022

(30) Foreign Application Priority Data
Oct. 1, 2019 (KR) .......................... 10-2019-0121448

(51) Int. Cl.
| | | |
|---|---|---|
| C08F 285/00 | (2006.01) | |
| C08J 5/02 | (2006.01) | |
| C08K 3/06 | (2006.01) | |
| C08K 3/22 | (2006.01) | |
| C08K 5/06 | (2006.01) | |

(52) U.S. Cl.
CPC .............. *C08F 285/00* (2013.01); *C08J 5/02* (2013.01); *C08K 3/06* (2013.01); *C08K 3/22* (2013.01); *C08K 5/06* (2013.01); *C08J 2313/02* (2013.01); *C08J 2371/02* (2013.01); *C08K 2003/2241* (2013.01); *C08K 2003/2296* (2013.01)

(58) Field of Classification Search
CPC ....... A41D 19/0055; C08L 13/02; C08L 9/04; C08K 5/06
See application file for complete search history.

(56) References Cited

U.S. PATENT DOCUMENTS

| | | | | |
|---|---|---|---|---|
| 2005/0113527 | A1* | 5/2005 | Perrella | ..................... C08L 9/04 525/310 |
| 2010/0104789 | A1 | 4/2010 | Imada et al. | |
| 2011/0229646 | A1 | 9/2011 | Kim et al. | |
| 2012/0149859 | A1 | 6/2012 | Yang et al. | |
| 2014/0002514 | A1 | 1/2014 | Richards | |
| 2015/0210906 | A1 | 7/2015 | Liang et al. | |
| 2017/0283599 | A1 | 10/2017 | Cha et al. | |
| 2017/0298210 | A1 | 10/2017 | Joe et al. | |
| 2019/0040238 | A1 | 2/2019 | Lee et al. | |
| 2019/0085157 | A1 | 3/2019 | Kim et al. | |
| 2021/0162636 | A1 | 6/2021 | Enomoto et al. | |
| 2021/0221966 | A1* | 7/2021 | Enomoto | ............. C09D 109/02 |

FOREIGN PATENT DOCUMENTS

| | | | | |
|---|---|---|---|---|
| CN | 108395595 | A * | 8/2018 | ......... A41D 19/0055 |
| CN | 110072401 | A | 7/2019 | |
| CN | 111499947 | A * | 8/2020 | ......... A41D 19/0055 |
| EP | 3473121 | A1 | 4/2019 | |
| JP | 2002188075 | A * | 7/2002 | |
| JP | 201488536 | A | 5/2014 | |
| JP | 6298839 | B2 | 3/2018 | |
| KR | 20100014936 | A | 2/2010 | |
| KR | 20100035191 | A | 4/2010 | |
| KR | 20100133638 | A | 12/2010 | |
| KR | 20160076988 | A | 7/2016 | |
| KR | 20170110956 | A | 10/2017 | |
| KR | 20190044824 | A | 5/2019 | |
| KR | 20190066151 | A | 6/2019 | |
| KR | 20190090395 | A | 8/2019 | |
| WO | 2019102985 | A1 | 5/2019 | |

OTHER PUBLICATIONS

Machine translation of CN-111499947-A (2020, 9 pages).*
Machine translation of JP-2002188075-A (2002, 7 pages).*
Creative PEGWorks (Epoxide glycidyl ether PEG, Creative PEGWorks, 2023, 4 pages).*
Machine translation of CN-108395595-A (2018, 5 pages).*
Extended European Search Report for EP Application No. 20870638 Feb. 15, 2022, 2 pgs.
Daniela Hutanu, et al., "Recent Applications of Polyethylene Glycols (PEGs) and PEG Derivatives", Modern Chemistry & Applications, published Aug. 2014, pp. 1-6, vol. 2, No. 2, USA.
International Search Report for Application No. PCT/KR2020/010658, mailing dated Nov. 19, 2020, 2 pages. .

* cited by examiner

*Primary Examiner* — Brieann R Johnston
(74) *Attorney, Agent, or Firm* — Lerner David LLP

(57) ABSTRACT

The present invention relates to a latex composition for dip molding, and such latex composition includes: a carboxylic acid-modified nitrile-based copolymer latex; and a reactive compound having three or more branched chains and a reactive group at a terminal of each of the branched chains, wherein the reactive group is one or more selected from the group consisting of an amine group, a hydroxy group, an epoxy group, a glycidyl group, and an isocyanate group.

12 Claims, No Drawings

LATEX COMPOSITION FOR DIP MOLDING, DIP-MOLDED PRODUCT COMPRISING SAME, AND METHOD FOR MANUFACTURING DIP-MOLDED PRODUCT BY USING SAME

CROSS-REFERENCE TO RELATED APPLICATIONS

The present application is a national stage entry under 35 U.S.C. § 371 of International Application No. PCT/KR2020/010658 filed on Aug. 12, 2020, which claims priority from Korean Patent Application No. 10-2019-0121448, filed on Oct. 1, 2019, the entire contents of which are incorporated herein by reference.

TECHNICAL FIELD

The present invention relates to a latex composition for dip molding, and more particularly, to a latex composition for dip molding, a dip-molded article including the same, and a method of producing a dip-molded article using the same.

BACKGROUND ART

A rubber glove has been widely used in fields such as housework, the food industry, the electronic industry, and medical fields. Until now, a rubber glove produced by dip molding a natural rubber latex has been widely used; however, a protein contained in a natural rubber caused an allergic reaction such as pain or a rash in some users, which was problematic. Due to such a problem, recently, a carboxylic acid-modified nitrile-based glove that does not cause an allergic reaction has been spotlighted in a disposable glove market. In general, the carboxylic acid-modified nitrile-based glove is produced by preparing a latex composition through mixing sulfur and a vulcanization accelerator with a carboxylic acid-modified nitrile-based copolymer latex and dip-molding the latex composition. When working while wearing a rubber glove in which such a sulfur and vulcanization accelerator are included for a long time, an odor may be generated from the sulfur, and discoloration of the glove easily occurs, which lowers the product value and is harmful to a human by causing an allergic reaction in some users. Therefore, there have been steady attempts to minimize a content of each of the sulfur and the vulcanization accelerator and to replace them.

Meanwhile, zinc oxide is used to form an ionic bond with a carboxylic acid functional group of the carboxylic acid-modified nitrile-based copolymer latex and thus to increase strength of the glove together with sulfur and a vulcanization accelerator. However, in the case of using the zinc oxide used for cross-linking of the carboxylic acid-modified nitrile-based copolymer latex, the glove may be swollen in an organic solvent and the bonding may thus be weakened due to the nature of the ionic bond when exposed to the organic solvent for a long time, which causes the organic solvent to permeate the glove. Therefore, skin of a user is directly exposed to the organic solvent in spite of using a glove.

DISCLOSURE

Technical Problem

In order to solve the problems mentioned in the background art, an object of the present invention is to provide a molded article having high elasticity and soft texture required for a molded article even though a component harmful to a human, such as sulfur, a vulcanization accelerator, zinc oxide, or the like, that is included in a latex composition for dip molding is not used or a used amount thereof is minimized.

Technical Solution

In one general aspect, a latex composition for dip molding includes: a carboxylic acid-modified nitrile-based copolymer latex; and a reactive compound having three or more branched chains and a reactive group at a terminal of the branched chain, wherein the reactive group is one or more selected from the group consisting of an amine group, a hydroxy group, an epoxy group, a glycidyl group, and an isocyanate group.

In another general aspect, a dip-molded article includes a layer derived from the latex composition for dip molding.

In still another general aspect, a cross-linked polymer includes two or more parts derived from a carboxylic acid-modified nitrile-based copolymer; a part derived from a reactive compound having three or more branched chains and a reactive group at a terminal of the branched chain; and a cross-linking part formed by cross-linking a carboxylic acid group included in the carboxylic acid-modified nitrile-based copolymer and the reactive group included in the reactive compound.

Advantageous Effects

The latex composition for dip molding according to the present invention includes the carboxylic acid-modified nitrile-based copolymer latex and the reactive compound having three or more reactive groups cross-linkable with the carboxylic acid group of the carboxylic acid-modified nitrile-based copolymer latex at the terminal of the branched chain, such that a molded article having high elasticity and soft texture may be obtained even though sulfur, a vulcanization accelerator, or zinc oxide that is included in a carboxylic acid-modified nitrile-based copolymer latex composition is not used or a used amount thereof is minimized.

That is, two or more carboxylic acid-modified nitrile-based copolymers are cross-linked by the reactive compound having a specific reactive group, such that a molded article may have excellent tensile properties such as tensile strength and modulus, a preferred network structure may be formed due to an increase in content of insoluble MEK, and soft texture may thus be imparted to the molded article.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

Hereinafter, the present invention will be described in more detail in order to assist in the understanding of the present invention.

The term "monomer-derived repeating unit" in the present invention may refer to a component or structure derived from a monomer or a material itself, and may refer to a repeating unit formed in a polymer by an added monomer participating in a polymerization reaction during polymerization of the polymer.

The term "latex" in the present invention may refer to that a polymer or a copolymer polymerized by polymerization is present in a form dispersed in water. As a specific example, term "latex" may refer to that fine particles of a rubber-like polymer or fine particles of a rubber-like copolymer polymerized by emulsion polymerization are present in a colloidal state in which the fine particles are dispersed in water.

The term "layer derived" in the present invention may refer to a layer formed from a polymer or a copolymer. As a specific example, the term "layer derived" may refer to a layer formed from a polymer or a copolymer by attaching, fixing, and/or polymerizing the polymer or the copolymer on a dip molding mold when producing a dip-molded article.

The term "cross-linking part" in the present invention may refer to a component or structure derived from a compound or a material itself, and may refer to a "cross-linking part" for cross-linking in a polymer or between polymers, the polymer being formed by an action and reaction of a cross-linking agent.

A latex composition for dip molding according to an exemplary embodiment of the present invention may include a carboxylic acid-modified nitrile-based copolymer latex and a reactive compound.

Meanwhile, carboxylic acid-modified nitrile-based copolymer in the carboxylic acid-modified nitrile-based copolymer latex according to an exemplary embodiment of the present invention may include a conjugated diene-based monomer-derived repeating unit, an ethylenically unsaturated nitrile-based monomer-derived repeating unit, and an ethylenically unsaturated acid monomer-derived repeating unit.

A conjugated diene-based monomer constituting the conjugated diene-based monomer-derived repeating unit of the present invention may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene, and as a more specific example, the conjugated diene-based monomer may be 1,3-butadiene.

A content of the conjugated diene-based monomer-derived repeating unit may be 40 wt % to 89 wt %, 45 wt % to wt %, or 50 wt % to 78 wt %, with respect to a total content of the carboxylic acid-modified nitrile-based copolymer. Within these ranges, a dip-molded article molded from the latex composition for dip molding including the carboxylic acid-modified nitrile-based copolymer is flexible and has not only an excellent wearability but also an excellent oil resistance and tensile strength.

In addition, an ethylenically unsaturated nitrile-based monomer constituting the ethylenically unsaturated nitrile-based monomer-derived repeating unit of the present invention may be one or more selected from the group consisting of acrylonitrile, methacrylonitrile, fumaronitrile, α-chloronitrile, and α-cyanoethylacrylonitrile. As a specific example, the ethylenically unsaturated nitrile-based monomer may be acrylonitrile or methacrylonitrile, and as a more specific example, the ethylenically unsaturated nitrile-based monomer may be acrylonitrile.

A content of the ethylenically unsaturated nitrile-based monomer may be 10 wt % to 50 wt %, 15 wt % to 45 wt %, or 20 wt % to 40 wt %, with respect to the total content of the carboxylic acid-modified nitrile-based copolymer. Within these ranges, a dip-molded article molded from the latex composition for dip molding including the carboxylic acid-modified nitrile-based copolymer is flexible and has not only an excellent wearability but also an excellent oil resistance and tensile strength.

In addition, an ethylenically unsaturated acid monomer constituting the ethylenically unsaturated acid monomer-derived repeating unit may be an ethylenically unsaturated monomer having an acid group such as a carboxyl group, a sulfonic acid group, or an acid anhydride group. As a specific example, the ethylenically unsaturated acid monomer may be one or more selected from the group consisting of an ethylenically unsaturated acid monomer such as acrylic acid, methacrylic acid, itaconic acid, maleic acid, or fumaric acid; polycarboxylic acid anhydride such as maleic acid anhydride or citraconic acid anhydride; an ethylenically unsaturated sulfonic acid monomer such as styrenesulfonic acid; and a partial ester monomer of ethylenically unsaturated polycarboxylic acid, such as monobutyl fumarate, monobutyl maleate, or mono-2-hydroxypropyl maleate. As a more specific example, the ethylenically unsaturated acid monomer may be one or more selected from the group consisting of acrylic acid, methacrylic acid, itaconic acid, maleic acid, and fumaric acid. As a still more specific example, the ethylenically unsaturated acid monomer may be methacrylic acid. The ethylenically unsaturated acid monomer may be used in a form of a salt such as an alkali metal salt or an ammonium salt during polymerization.

A content of the ethylenically unsaturated acid monomer-derived repeating unit may be 1 wt % to 10 wt %, 1.5 wt % to 9 wt %, or 2 wt % to 8 wt %, with respect to the total content of the carboxylic acid-modified nitrile-based copolymer. Within these ranges, a dip-molded article molded from the latex composition for dip molding including the carboxylic acid-modified nitrile-based copolymer is flexible and has not only an excellent wearability but also an excellent tensile strength.

The carboxylic acid-modified nitrile-based copolymer in the carboxylic acid-modified nitrile-based copolymer latex of the present invention may further selectively include an ethylenically unsaturated monomer-derived repeating unit, in addition to the conjugated diene-based monomer-derived repeating unit, the ethylenically unsaturated nitrile-based monomer-derived repeating unit, and the ethylenically unsaturated acid monomer-derived repeating unit.

The ethylenically unsaturated monomer constituting the ethylenically unsaturated monomer-derived repeating unit may be one or more selected from the group consisting of a hydroxyalkyl (meth)acrylate monomer having 1 to 4 carbon atoms; a vinyl aromatic monomer selected from the group consisting of styrene, alkylstyrene, and vinyl naphthalene; fluoroalkyl vinyl ether such as fluoro ethyl vinyl ether; an ethylenically unsaturated amide monomer selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; a non-conjugated diene monomer such as vinyl pyridine, vinyl norbornene, dicyclopentadiene, or 1,4-hexadiene; and an ethylenically unsaturated carboxylic acid ester monomer selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth)acrylate, 2-cyanoethyl (meth) acrylate, 1-cyanopropyl (meth)acrylate, 2-ethyl-6-cyano-hexyl(meth)acrylate, 3-cyanopropyl (meth)acrylate, hydroxyethyl (meth)acrylate, hydroxypropyl (meth)acrylate, glycidyl (meth)acrylate, and dimethylamino ethyl (meth)acrylate. As a more specific example, the ethylenically unsaturated monomer constituting the ethylenically unsaturated monomer-derived repeating unit may be one or more selected from the group consisting of hydroxyalkyl (meth)acrylate monomers having 1 to 4 carbon atoms, and as a still more specific example, the ethylenically unsaturated monomer constituting the ethylenically unsaturated monomer-derived repeating unit may be a hydroxyethyl (meth)acrylate monomer.

A content of the ethylenically unsaturated monomer-derived repeating unit may be within 20 wt %, 0.2 to 10 wt %, or 0.5 to 5 wt %, with respect to the total content of the carboxylic acid-modified nitrile-based copolymer. Within these ranges, a dip-molded article molded from the latex composition for dip molding including the carboxylic acid-modified nitrile-based copolymer is flexible and has not only an excellent wearability but also an excellent tensile strength.

Meanwhile, the reactive compound according to an exemplary embodiment of the present invention may be a compound having three or more branched chains and a reactive group at a terminal of the branched chain.

Specifically, the number of the branched chains of the reactive compound may be at least 3, and the branched chains may be star polyether polymers which may be branched from one branch point. In addition, the branched chain may include a repeating unit represented by the following Formula 1.

[Formula 1]

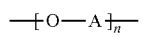

wherein A may be an alkylene group having 2 to 5 carbon atoms.

In addition, n may be an integer of 1 to 500, specifically, 100 to 300, and more specifically, 150 to 250. When n is excessively small, reactivity between the reactive compound and the carboxylic acid-modified nitrile-based copolymer is too high, and stability of a cross-linked polymer may be deteriorated, whereas, when n is too large, processability and dispersibility of the cross-linked polymer may be deteriorated. Therefore, n is preferably within the above ranges.

Meanwhile, the reactive group included at the terminal of each branched chain of the reactive compound may be one or more selected from the group consisting of an amine group, a hydroxy group, an epoxy group, a glycidyl group, and an isocyanate group. The reactive groups at the terminals of the branched chains may be the same as each other or different from each other.

In addition, the one branch point is not limited as long as it may provide a branched chain to the reactive compound, and specifically, the one branch point may be carbon.

More specifically, the reactive compound may be a compound represented by the following Formula 2.

[Formula 2]

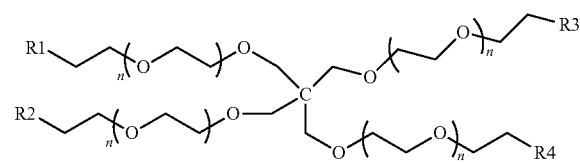

wherein n may be an integer of 1 to 500, specifically, 100 to 300, and more specifically, 150 to 250. In addition, R1 to R4 are each independently one selected from the group consisting of an amine group, a hydroxy group, an epoxy group, a glycidyl group, and an isocyanate group.

Specific examples of the reactive compound may include star polyethylene glycol whose terminal is modified with amine, hydroxy, epoxy, glycidyl, or isocyanate; star polypropylene oxide whose terminal is modified with amine, hydroxy, epoxy, glycidyl, or isocyanate; and a star polyethylene oxide-polypropylene oxide copolymer whose terminal is modified with amine, hydroxy, epoxy, glycidyl, or isocyanate.

The reactive compound may be cross-linked to a carboxylic acid group included in the carboxylic acid-modified nitrile-based copolymer to form a network structure. Meanwhile, the reactive group formed at the terminal of the branched chain included in the reactive compound may be cross-linked to one of the carboxylic acid groups included in the carboxylic acid-modified nitrile-based copolymer to form a cross-linking part.

For example, the reactive group of each of the three or more branched chains of the reactive compound cross-links the carboxylic acid groups of the carboxylic acid-modified nitrile-based copolymer latex to form a network structure, thereby imparting high elasticity to a dip-molded article including the reactive group.

Meanwhile, even in a case where a dip-molded article produced from the latex composition for dip molding including the cross-linked polymer of the carboxylic acid-modified nitrile-based copolymer which is cross-linked by the reactive compound includes a small amount of a vulcanization component (sulfur powder, a vulcanization accelerator, or zinc oxide) (used together with the reactive compound) or does not include the vulcanization component, the high elasticity and soft texture are imparted to the molded article.

The presence or absence of the formation of the preferred network structure of the molded article may be indirectly confirmed by measuring the amount of insoluble methyl ethyl ketone of the produced molded article. In a case where the reactive compound of the present invention is mixed with the latex composition for dip molding, the amount of insoluble methyl ethyl ketone of the produced molded article may be 90% or more.

Meanwhile, a content of the reactive compound may be 0.1 parts by weight to 5 parts by weight, specifically, 0.1 to 3 parts by weight, and more specifically, 0.3 to 3 parts by weight, based on 100 parts by weight of a solid content of the carboxylic acid-modified nitrile-based copolymer latex. When the reactive compound is included in an amount of 0.1 parts by weight or more, the carboxylic acid-modified nitrile-based copolymer may have a preferred network structure, and a more preferred elongation property may be imparted to the molded article as compared to a case in which the reactive compound is included in an amount of 0.1 parts by weight or less. Here, the content of the reactive compound may be a total amount of the reactive compound which is included in the latex composition for dip molding to form the cross-linked polymer with the carboxylic acid-modified nitrile-based copolymer, and the reactive compound remaining in the latex composition for dip molding.

An upper limit of a weight average molecular weight of the multi-arm reactive compound may be 40,000, preferably 30,000, and most preferably 20,000, and a lower limit of the weight average molecular weight of the multi-arm reactive compound may be about 450, preferably 600, and most preferably about 800.

In addition, the latex composition for dip molding of the present invention may further include an additive such as a vulcanizing agent, a cross-linking agent, a pigment, a vulcanization accelerator, a filler, or a pH adjuster, if necessary.

In particular, a component such as a vulcanizing agent, a cross-linking accelerator, or a cross-linking agent (zinc oxide) may not be added to the latex composition for dip molding according to an exemplary embodiment of the present invention, or the component may be partially added to the latex composition for dip molding, if necessary. However, even in a case where the component is added, the component may be added in an amount smaller than the amount of the vulcanization component to be generally added. The case in which the composition such as the vulcanizing agent, the cross-linking accelerator, or the cross-linking agent (zinc oxide) is added is as follows.

The vulcanizing agent is a component for vulcanizing the latex composition for dip molding, and may be sulfur such as powdered sulfur, precipitated sulfur, colloidal sulfur, surface-treated sulfur, or insoluble sulfur. A content of the vulcanizing agent may be 0.01 to 5 parts by weight, 0.01 to 0.8 parts by weight, or 0.01 to 0.7 parts by weight, based on the solid content of 100 parts by weight of the carboxylic acid-modified nitrile-based copolymer latex.

In addition, according to an exemplary embodiment of the present invention, the vulcanization accelerator may be one or more selected from the group consisting of 2-mercaptobenzothiazole (MBT), 2,2-dithiobisbenzothiazole-2-sulfenamide (MBTS), N-cyclohexylbenzothiasole-2-sulfenamide (CBS), 2-morpholinothiobenzothiazole (MBS), tetramethylthiurammonosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. A content of the vulcanizing accelerator may be 0.01 to 5 parts by weight, 0.01 to 0.6 parts by weight, or 0.01 to 0.5 parts by weight, based on the solid content of 100 parts by weight of the carboxylic acid-modified nitrile-based copolymer latex.

In addition, the latex composition for dip molding according to an exemplary embodiment of the present invention may include zinc oxide or titanium oxide as a cross-linking agent. The zinc oxide or titanium oxide may be included in the latex composition for dip molding in an amount of 0.01 to 5 parts by weight or 0.01 to 0.3 parts by weight.

A glass transition temperature of the carboxylic acid-modified nitrile-based copolymer latex of the present invention may be −55° C. to −15° C., −50° C. to −15° C., or −50° C. to −20° C. Within these ranges, a molded article dip-molded from the latex composition for dip molding including the carboxylic acid-modified nitrile-based copolymer latex has an excellent wearability due to its low stickiness while preventing degradation in tensile properties such as tensile strength, and cracks. The glass transition temperature may be measured using differential scanning calorimetry.

In addition, an average particle size of particles of the carboxylic acid-modified nitrile-based copolymer in the carboxylic acid-modified nitrile-based copolymer latex of the present invention may be 90 nm to 200 nm, 95 nm to 195 nm, or 100 nm to 190 nm. Within these ranges, a viscosity of the carboxylic acid-modified nitrile-based copolymer latex is not increased, such that a carboxylic acid-modified nitrile-based copolymer latex may be prepared at a high concentration, and a molded article dip-molded from the latex composition for dip molding including the carboxylic acid-modified nitrile-based copolymer latex has excellent tensile properties such as tensile strength. The average particle size may be measured using a laser scattering analyzer (Nicomp).

In addition, a solid content (concentration) of the latex composition for dip molding of the present invention may be, for example, 8 wt % to 40 wt %, 8 wt % to 35 wt %, or 10 wt % to 35 wt %. Within these ranges, latex transport efficiency is excellent, and an increase in viscosity of the latex is prevented, such that storage stability is excellent.

As another example, a pH of the latex composition for dip molding may be 8 to 12, 9 to 11, or 9.0 to 11.5. Within these ranges, processability and productivity when producing a dip-molded article may be excellent. The pH of the latex composition for dip molding may be adjusted by addition of the pH adjuster described above. Examples of the pH adjuster may include an aqueous potassium hydroxide solution having a concentration of 1 wt % to 5 wt %, and ammonia water having a concentration of 1 wt % to 10 wt %.

According to the present invention, a method of preparing the latex composition for dip molding is provided. As a specific example, the method of preparing the latex composition for dip molding may include a step S10 of emulsion-polymerizing a monomer mixture including a conjugated diene-based monomer, an ethylenically unsaturated nitrile-based monomer, and an ethylenically unsaturated acid monomer to obtain a carboxylic acid-modified nitrile-based copolymer latex. The method may include a step S20 of selectively adding a sulfur component, a vulcanization accelerator, and a cross-linking agent in the presence of the obtained carboxylic acid-modified nitrile-based copolymer latex. Meanwhile, a reactive compound having three or more branched chains and a reactive group at a terminal of the branched chain may be separately added in the step S10, the step S20, or in both the step S10 and the step S20.

Meanwhile, the reactive compound may be added in an amount of 0.1 parts by weight to 5 parts by weight based on the solid content of the 100 parts by weight of the carboxylic acid-modified nitrile-based copolymer latex. In a case where the sulfur component, the vulcanization accelerator, and the cross-linking agent are selectively added, the sulfur component, the vulcanization accelerator, and the cross-linking agent may be added in amounts of 0.8 parts by weight or less, 0.6 parts by weight or less, and 1.1 parts by weight or less, respectively, based on the solid content of the 100 parts by weight of the carboxylic acid-modified nitrile-based copolymer latex.

Meanwhile, the reactive compound added in the step S10 may be separately added to the monomer mixture, the carboxylic acid-modified nitrile-based copolymer latex obtained after the emulsion polymerization, or both of them.

According to an exemplary embodiment of the present invention, the step S10 may be a step of performing emulsion-polymerizing by further adding an emulsifier, a polymerization initiator, an activator, a chain transfer agent, or the like to the monomer mixture constituting the carboxylic acid-modified nitrile-based copolymer, specifically, the monomer mixture including the conjugated diene-based monomer, the ethylenically unsaturated nitrile-based monomer, and an ethylenically unsaturated acid monomer. Each monomer included in the monomer mixture may be added as the same type and content as those described above. The monomers may be added at the same time or continuously added.

Meanwhile, in the polymerization, the entire monomer mixture may be added to a polymerization reactor prior to the polymerization, or a part of the monomer mixture may be primarily added to the polymerization reactor, and a residual monomer mixture may be added after polymerization is initiated. In a case where the monomer mixture is separately added as described above, a distribution of the monomers may be uniform due to a reaction speed difference between the monomers when a monomer-derived repeating unit is formed from each monomer in the carboxylic acid-modified nitrile-based copolymer. Therefore, a balance between physical properties of a dip-molded article produced by using the carboxylic acid-modified nitrile-based copolymer may be improved.

For example, the emulsifier may be one or more selected from the group consisting of an anionic surfactant, a nonionic surfactant, a cationic surfactant, and an amphoteric surfactant. As a specific example, the emulsifier may be one or more anionic surfactants selected from the group consisting of alkylbenzene sulfonate, aliphatic sulfonate, sulfate ester of higher alcohol, α-olefin sulfonate, and alkyl ether sulfate. The emulsifier may be added in an amount of 0.3 parts by weight to 10 parts by weight, 0.8 parts by weight to 8 parts by weight, or 1.5 parts by weight to 6 parts by weight, with respect to a total content of 100 parts by weight of the monomer mixture. Within these ranges, the polymerization stability may be excellent, and a molded article may be easily produced due to a small amount of foam.

In addition, for example, the polymerization initiator may be one or more selected from the group consisting of inorganic peroxide such as sodium persulfate, potassium persulfate, ammonium persulfate, potassium perphosphate, or hydrogen peroxide; organic peroxide such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutylate; and a nitrogen compound such as azobisisobutyronitrile, azobis-2,4-dimethylvaleronitrile, azobiscyclohexanecarbonitrile, or methyl azobisisobutyrate. As a specific example, the polymerization initiator may be inorganic peroxide, and as a more specific example, the polymerization initiator may be potassium persulfate. The polymerization initiator may be added in an amount of 0.01 parts by weight to 2 parts by weight, or 0.02 parts by weight to 1.5 parts by weight, with respect to the total content of 100 parts by weight of the monomer mixture. Within these ranges, a polymerization speed may be maintained at an appropriate level.

In addition, for example, the activator may be one or more selected from the group consisting of sodium formaldehyde sulfoxylate, sodium ethylenediaminetetraacetate, ferrous sulfate, dextrose, sodium pyrophosphate, and sodium sulfate. The activator may be added in an amount of 0.001 parts by weight to 5 parts by weight with respect to the total content of 100 parts by weight of the monomer mixture.

In addition, for example, the chain transfer agent may be one or more selected from the group consisting of α-methylstyrene dimer; mercaptans such as t-dodecyl mercaptan, n-dodecyl mercaptan, and octyl mercaptan; halogenated hydrocarbon such as carbon tetrachloride, methylene chloride, or methylene bromide; and a sulfur-containing compound such as tetraethylthiuram disulfide, dipentamethylenethiuram disulfide, or diisopropyl xanthogen disulfide. As a specific example, the chain transfer agent may be t-dodecyl mercaptan. The chain transfer agent may be added in an amount of 0.1 parts by weight to 2.0 parts by weight, 0.2 parts by weight to 1.5 parts by weight, or 0.3 parts by weight to 1 part by weight, with respect to the total content of 100 parts by weight of the monomer mixture. Within these ranges, the polymerization stability is excellent, and physical properties of a molded article when producing the molded article after the polymerization are excellent.

In addition, according to an exemplary embodiment of the present invention, the polymerization may be performed in a medium such as water, and as a specific example, deionized water. The polymerization may be performed by further including an additive such as a chelating agent, a dispersant, a pH adjuster, a deoxidizer, a particle size adjuster, an antioxidant, or an oxygen scavenger, if necessary, to ensure ease of polymerization.

According to an exemplary embodiment of the present invention, the emulsifier, the polymerization initiator, the chain transfer agent, the additive, and the like may be added at the same time, or separately added to a polymerization reactor, together with the monomer mixture, and each addition may be continuously performed.

In addition, according to an exemplary embodiment of the present invention, the polymerization of the carboxylic acid-modified nitrile-based copolymer may be performed at a polymerization temperature of 10° C. to 90° C., 20° C. to 80° C., or 25° C. to 75° C. Within these ranges, latex stability is excellent.

Meanwhile, the method of preparing the carboxylic acid-modified nitrile-based copolymer latex of the present invention may include terminating a polymerization reaction to obtain a carboxylic acid-modified nitrile-based copolymer latex. The polymerization reaction of the carboxylic acid-modified nitrile-based copolymer may be terminated when a polymerization conversion rate reaches 90% or more, 91% or more, 93% or more. The polymerization reaction may be terminated by addition of a polymerization terminating agent, a pH adjuster, or an antioxidant. In addition, the method of preparing the carboxylic acid-modified nitrile-based copolymer may further include removing unreacted monomers through a deodorization and concentration process, after the reaction termination.

In addition, according to an exemplary embodiment of the present invention, the step S20 may be a step of adding and mixing sulfur and a vulcanization accelerator; and one or more cross-linking agents selected from the group consisting of zinc oxides to and with the nitrile-based copolymer latex or the carboxylic acid-modified nitrile-based copolymer latex prepared in the step S10 to prepare a latex composition for dip molding in which the cross-linking agent is dispersed in the nitrile-based copolymer latex or the carboxylic acid-modified nitrile-based copolymer latex. The cross-linking agent may be added in the same type, content, and form as those described above.

According to the present invention, a molded article including a layer derived from the latex composition for dip molding is provided. The molded article may be a dip-molded article produced by dip-molding the latex composition for dip molding, and may be a molded article including a layer derived from the latex composition for dip molding formed from the latex composition for dip molding by dip molding. A method of producing the molded article may include dipping the latex composition for dip molding by a direct dipping method, an anode coagulation dipping method, a Teague's coagulation dipping method, or the like. As a specific example, the molded article may be produced by an anode coagulation dipping method, and in this case, a dip-molded article having a uniform thickness may be obtained.

As a specific example, the method of producing the molded article may include: a step S100 of attaching a coagulant to a dip molding mold; a step S200 of dipping the dip molding mold to which the coagulant is attached into a latex composition for dip molding to form a layer derived from the latex composition for dip molding, that is, a dip-molded layer; and a step S300 of heating the dip-molded layer to cross-link the latex composition for dip molding.

The step S100 is a step of dipping a dip molding mold into a coagulant solution to attach a coagulant to the dip molding mold so as to attach the coagulant to a surface of the dip molding mold. The coagulant solution is a solution obtained by dissolving a coagulant in water, alcohol, or a mixture thereof. A content of the coagulant in the coagulant solution may be 5 wt % to 50 wt %, 7 wt % to 45 wt %, or 10 wt % to 40 wt %, with respect to a total content of the coagulant solution. The coagulant may be, for example, one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

In addition, the step S200 may be a step of dipping the dip molding mold to which the coagulant is attached into the latex composition for dip molding according to the present invention and taking out the dip molding mold to form a dip-molded layer on the dip molding mold.

In addition, the step S300 may be a step of heating the dip-molded layer formed in the dip molding mold and cross-linking and curing the latex composition for dip molding to obtain a dip-molded article.

Thereafter, the dip-molded layer cross-linked by the heating treatment may be removed from the dip molding mold to obtain a dip-molded article.

According to an exemplary embodiment of the present invention, the molded article may be a glove such as a surgical glove, an examination glove, an industrial glove, or a household glove, a condom, a catheter, or a health care product.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

EXAMPLES

Example 1

(1) Preparation of Carboxylic Acid-Modified Nitrile-Based Copolymer Latex for Dip Molding To a reaction vessel, a monomer mixture including 27 parts by weight of acrylonitrile, 68 parts by weight of 1,3-butadiene, and 5 parts by weight of methacrylic acid, and t-dodecyl mercaptan, sodium alkyl benzene sulfonate, and water were added in amounts of 0.5 parts by weight, 2.0 parts by weight, and 140 parts by weight, respectively, with respect to 100 parts by weight of the monomer mixture, a temperature was raised to 40° C., and emulsion polymerization was initiated. When the polymerization conversion rate reached 65%, the temperature was raised to 70° C. and polymerization was performed. When the polymerization conversion rate reached 94%, the polymerization was terminated by adding 0.2 parts by weight of sodium dimethyldithiocarbamate. Unreacted monomers were removed through a deodorization process, and ammonia water, potassium hydroxide, an antioxidant, and a defoaming agent were added to obtain a carboxylic acid-modified nitrile-based copolymer latex having a solid content concentration of 44.5% and a pH of 8.0.

(2) Preparation of Latex Composition for Dip Molding

To 100 parts by weight (based on a solid content) of the obtained carboxylic acid-modified nitrile-based copolymer latex, 2.0 parts by weight (based on a solid content) of a reactive compound (n=200) (JenKem Technology) represented by the following Formula 3 wherein R in Formula 2 was an isocyanate group, the reactive compound being diluted with secondary distilled water at a solid content concentration of 50%, 0.7 parts by weight of sulfur powder, 0.5 parts by weight of zinc di-n-butyldithiocarbamate (ZDBC), 1.0 part by weight of zinc oxide, a potassium hydroxide solution, and an appropriate amount of secondary distilled water were added, to obtain a composition for dip molding having a solid content concentration of 30% and a pH of 9.5.

[Formula 3]

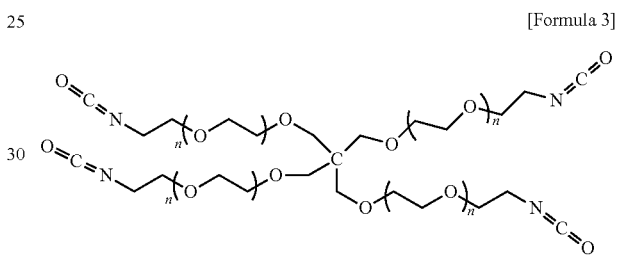

(3) Production of Dip-Molded Article 22 parts by weight of calcium nitrate, 77.5 parts by weight of water, and 0.5 parts by weight of a wetting agent (Teric 320, produced by Huntsman Corporation, Australia) were mixed with each other to prepare a coagulant solution. A hand-shaped ceramic mold was dipped into the solution for 1 minute and taken out from the solution, and the hand-shaped mold was dried at 80° C. for 3 minutes, thereby applying a coagulant to the hand-shaped mold. Thereafter, the mold to which the coagulant was applied was dipped into the carboxylic acid-modified nitrile-based copolymer latex composition prepared in (2) of Example 1 for 1 minute and taken out from the composition, and the mold was dried at 80° C. for 3 minutes and dipped into water for 3 minutes to carry out leaching. Thereafter, the mold was subjected to cross-linking at 120° C. for 20 minutes. The cross-linked dip-molded layer was removed from the hand-shaped mold, thereby obtaining a dip-molded article having a glove shape. Physical properties of the dip-molded article are shown in Table 1.

Example 2

A dip-molded article having a glove shape was produced in the same manner as that of Example 1, except that the reactive compound (n=200) of Formula 3 diluted with the secondary distilled water at a solid content concentration of 50% was added to the monomer mixture in an amount of 2.0 parts by weight (based on a solid content) in the preparation of the carboxylic acid-modified nitrile-based copolymer latex instead of in the preparation of the latex composition for dip molding in Example 1. Physical properties of the dip-molded article are shown in Table 1.

Example 3

A dip-molded article having a glove shape was produced in the same manner as that of Example 1, except that the sulfur powder and the zinc di-n-butyldithiocarbamate were not added in the preparation of the latex composition for dip molding in Example 1. Physical properties of the dip-molded article are shown in Table 1.

Example 4

A dip-molded article having a glove shape was produced in the same manner as that of Example 1, except that zinc oxide was added in an amount of 0.3 parts by weight in the preparation of the latex composition for dip molding in Example 1. Physical properties of the dip-molded article are shown in Table 1.

Example 5

A dip-molded article having a glove shape was produced in the same manner as that of Example 1, except that the reactive compound was added in an amount of 5.0 parts by weight (based on a solid content) instead of 2.0 parts by weight (based on a solid content) in the preparation of the latex composition for dip molding in Example 1. Physical properties of the dip-molded article are shown in Table 1.

Example 6

A dip-molded article having a glove shape was produced in the same manner as that of Example 1, except that the reactive compound was added in an amount of 0.1 parts by weight (based on a solid content) instead of 2.0 parts by weight (based on a solid content) in the preparation of the latex composition for dip molding in Example 1. Physical properties of the dip-molded article are shown in Table 1.

Example 7

A dip-molded article having a glove shape was produced in the same manner as that of Example 1, except that 2.0 parts by weight (based on a solid content) of the reactive compound (n=200) (JenKem Technology) represented by Formula 2 wherein R was an amine group was added as a reactive compound, instead of the reactive compound represented by Formula 3, in the preparation of the latex composition for dip molding in Example 1. Physical properties of the dip-molded article are shown in Table 1.

Example 8

A dip-molded article having a glove shape was produced in the same manner as that of Example 1, except that 2.0 parts by weight (based on a solid content) of the reactive compound (n=200) (Creative PEGWorks) represented by Formula 2 wherein R was a hydroxy group was added as a reactive compound, instead of the reactive compound represented by Formula 3, in the preparation of the latex composition for dip molding in Example 1. Physical properties of the dip-molded article are shown in Table 1.

Example 9

A dip-molded article having a glove shape was produced in the same manner as that of Example 1, except that 2.0 parts by weight (based on a solid content) of the reactive compound (n=200) (Creative PEGWorks) represented by Formula 2 wherein R was an epoxy group was added as a reactive compound, instead of the reactive compound represented by Formula 3, in the preparation of the latex composition for dip molding in Example 1. Physical properties of the dip-molded article are shown in Table 1.

Example 10

A dip-molded article having a glove shape was produced in the same manner as that of Example 1, except that 2.0 parts by weight (based on a solid content) of the reactive compound (n=200) (JenKem Technology) represented by the following Formula 4 was added as a reactive compound, instead of the reactive compound represented by Formula 3, in the preparation of the latex composition for dip molding in Example 1. Physical properties of the dip-molded article are shown in Table 1.

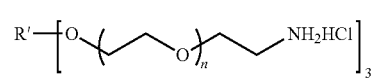

[Formula 4]

wherein R' represents a core structure of glycerol, and n is an integer of 200.

Example 11

A dip-molded article having a glove shape was produced in the same manner as that of Example 1, except that 2.0 parts by weight (based on a solid content) of the reactive compound (n=200) (JenKem Technology) represented by the following Formula 5 was added as a reactive compound, instead of the reactive compound represented by Formula 3, in the preparation of the latex composition for dip molding in Example 1. Physical properties of the dip-molded article are shown in Table 1.

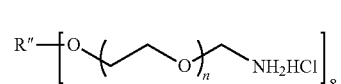

[Formula 5]

wherein R" represents a core structure of tripentaerythritol, and n is an integer of 200.

Comparative Example 1

A dip-molded article having a glove shape was produced in the same manner as that of Example 1, except that the reactive compound in Example 1 was not added. Physical properties of the dip-molded article are shown in Table 1.

Comparative Example 2

A dip-molded article having a glove shape was produced in the same manner as that of Example 2, except that the reactive compound in Example 2 was not added. Physical properties of the dip-molded article are shown in Table 1.

Comparative Example 3

A dip-molded article having a glove shape was produced in the same manner as that of Example 1, except that 1.0 part by weight of sulfur powder, 0.7 parts by weight of zinc di-n-butyldithiocarbamate, and 1.2 parts by weight of zinc oxide were added in the preparation of the latex composition for dip molding in Example 1. Physical properties of the dip-molded article are shown in Table 1.

Comparative Example 4

A dip-molded article having a glove shape was produced in the same manner as that of Example 1, except that 2.0 parts by weight of sulfur powder, 2.0 parts by weight of zinc di-n-butyldithiocarbamate, and 0.3 parts by weight of zinc oxide were added in the preparation of the latex composition for dip molding in Example 1. Physical properties of the dip-molded article are shown in Table 1.

Comparative Example 5

A dip-molded article having a glove shape was produced in the same manner as that of Example 1, except that 0.07 parts by weight of the reactive compound (n=200) represented by Formula 3, the reactive compound being diluted with the secondary distilled water at a solid content concentration of 50%, was added in the preparation of the latex composition for dip molding in Example 1. Physical properties of the dip-molded article are shown in Table 1.

Comparative Example 6

A dip-molded article having a glove shape was produced in the same manner as that of Example 1, except that 5.5 parts by weight of the reactive compound (n=200) represented by Formula 3, the reactive compound being diluted with secondary distilled water at a solid content concentration of 50%, was added in the preparation of the latex composition for dip molding in Example 1. Physical properties of the dip-molded article are shown in Table 1.

Comparative Example 7

A dip-molded article having a glove shape was produced in the same manner as that of Example 1, except that 2.0 parts by weight of linear polyethylene glycol diamine diluted with secondary distilled water at a solid content concentration of 50% was mixed in the preparation of the latex composition for dip molding in Example 1. Physical properties of the dip-molded article are shown in Table 1.

Experimental Example

Tensile strength, elongation, modulus of 300%, stress retention, and a content of insoluble MEK of each of the dip-molded articles produced in the examples and the comparative examples were measured to compare physical properties of the dip-molded articles with each other. The results are shown in Table 1.

(1) Tensile strength (MPa): A specimen was pulled at a cross-head speed of 500 mm/min using a universal testing machine (U.T.M.) (4466 model, Instron) according to ASTM D-412, a point at which the specimen was cut was measured, and then tensile strength was calculated according to the following Equation 1.

Tensile strength (Mpa)=(load value (kgf))/(thickness (mm)×width (mm))  [Equation 1]

(2) Elongation (%): A specimen was pulled at a cross-head speed of 500 mm/min using a universal testing machine (U.T.M.) (4466 model, Instron) according to ASTM D-412, a point at which the specimen was cut was measured, and then elongation was calculated according to the following Equation 2.

Elongation (%)=((length after stretching of specimen)/initial length of specimen))×100  [Equation 2]

(3) Modulus of 300% (MPa): A specimen was pulled at a cross-head speed of 500 mm/min using a universal testing machine (U.T.M.) (4466 model, Instron) according to ASTM D-412, stress when elongation was 300% was measured.

(4) Stress retention (%): A dumbbel-shaped specimen was prepared and pulled at a cross-head speed of 500 mm/min using a measurement device (U.T.M.) (4466 model, Instron) according to ASTM D-412 until elongation reached 100%, a stress reduction for 6 minutes was measured, and stress retention was calculated according to the following Equation 3.

Stress retention (%)=(load value after 6 minutes of specimen stretching)/initial load value of specimen stretching)×100  [Equation 3]

(5) Content of insoluble MEK: A hand portion of the produced dip-molded article was cut out into a piece of 2 mm×2 mm, 0.3 g of the piece was put into a 200 mesh, 100 ml of MEK was added thereto, and the piece was left at room temperature for 48 hours. Thereafter, the piece was dried, and a weight of the film was calculated.

Content of insoluble MEK (%)=(weight of film after drying)/0.3×100(%)  [Equation 4]

TABLE 1

| Classification | Example | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| Tensile strength (MPa) | 38.2 | 38.3 | 37.9 | 39.6 | 39.9 | 36.3 | 38.4 | 38.5 | 39.2 | 38.5 | 39.6 |
| Elongation (%) | 693.6 | 696.5 | 704.9 | 673.9 | 643.5 | 709.2 | 690 | 685.3 | 672.8 | 698.7 | 690.5 |
| Modulus of 300% (MPa) | 4.00 | 3.98 | 3.88 | 5.53 | 5.72 | 3.66 | 4.12 | 4.21 | 4.3 | 3.98 | 4.32 |
| Stress retention (%) | 55.3 | 54 | 51.1 | 50.2 | 56.8 | 50.1 | 54.8 | 53.9 | 52.8 | 53.2 | 54.4 |
| Content of insoluble MEK (%) | 94.5 | 93.5 | 95.3 | 91.2 | 96.5 | 90.8 | 93.1 | 94.7 | 93.8 | 92.5 | 95.5 |

TABLE 2

| Classification | Comparative Example | | | | | | |
|---|---|---|---|---|---|---|---|
| | 1 | 2 | 3 | 4 | 5 | 6 | 7 |
| Tensile strength (MPa) | 10.1 | 11.1 | 38.1 | 32.7 | 33.1 | 42.1 | 25.3 |
| Elongation (%) | 756.1 | 776.8 | 580.7 | 640.4 | 729.8 | 610.7 | 729.8 |
| Modulus of 300% (MPa) | 2.5 | 2.8 | 8.11 | 5.78 | 3.16 | 8.26 | 3.16 |
| Stress retention (%) | 30.1 | 31.2 | 38.4 | 44.7 | 40.3 | 53.1 | 40.3 |
| Content of insoluble MEK (%) | 69.5 | 70.1 | 80.4 | 86.4 | 88.5 | 97.0 | 73.4 |

As can be seen from the results of Table 1, mechanical strength such as tensile strength, elongation, and stress retention, and tensile properties such as elastic properties were excellent in the dip-molded article according to each of the examples of the present invention. Further, the formation of the preferred network structure of the carboxylic acid-modified nitrile-based copolymer in the molded-article may be inferred from the numerical values of the content of the insoluble MEK. In particular, it could be confirmed that the preferred numerical value of the content of the insoluble MEK was obtained by the addition of the reactive compound of the present invention, even though the addition amount of the vulcanization component (sulfur powder, a vulcanization accelerator, or zinc oxide) was lower than that in a general case or the vulcanization component was not added. It could be confirmed from this that a molded article in which the addition amount of the vulcanization component was minimized was produced.

On the contrary, in the case where the reactive compound of the present invention was not used, the preferred network structure of the carboxylic acid-modified nitrile-based copolymer was not formed (Comparative Examples 1 and 2), and even in the case where the reactive compound of the present invention was used, when the used amount of the reactive compound was small (Comparative Example 5), the tensile properties and the content of the insoluble MEK were inferior to those in Example 6. Meanwhile, in the case where the excessive amount of the reactive compound of the present invention was used (Comparative Example 6), the content of the insoluble MEK was excellent, but the tensile properties, in particular, the elongation, was not excellent. Meanwhile, in the case where the compound having two reactive groups was used instead of the reactive compound of the present invention (Comparative Example 7), the effects intended by the present invention were not achieved in terms of the tensile properties and the content of the insoluble MEK.

In particular, from the comparison of the examples of the present invention with Comparative Examples 3 and 4, it could be confirmed that even in the case where the vulcanization component (sulfur powder, a vulcanization accelerator, or zinc oxide) was used in a small amount or was not used in the preparation of the latex composition for dip molding, the tensile properties and the network structure inferred from the content of the insoluble MEK were excellent due to the use of the reactive compound of the present invention. It was confirmed from this that a molded article having high elasticity and soft texture was produced.

The invention claimed is:
1. A latex composition for dip molding, the latex composition comprising:
   a carboxylic acid-modified nitrile-based copolymer latex; and
   a reactive compound having three or more branched chains and a reactive group at a terminal of each of the three or more branched chains,
   wherein the reactive group is one or more selected from the group consisting of an amine group, a hydroxy group, an epoxy group, a glycidyl group, and an isocyanate group,
   wherein each of the three or more branched chains included in the reactive compound comprises a repeating unit represented by Formula 1,

[Formula 1]

wherein A is an alkylene group having 2 to 5 carbon atoms, and n is an integer of 150 to 250.

2. The latex composition of claim 1, wherein the reactive compound is represented by the following Formula 2,

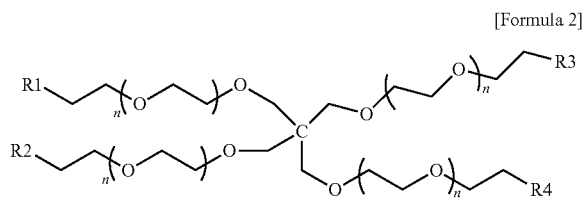

[Formula 2]

wherein n is an integer of 150 to 250, and R1 to R4 are each independently one selected from the group consisting of an amine group, a hydroxy group, an epoxy group, a glycidyl group, and an isocyanate group.

3. The latex composition of claim 2, wherein the reactive compound has a weight average molecular weight of 450 to 40,000.

4. The latex composition claim 1, wherein the reactive compound is included in 0.1 parts by weight to 5 parts by weight based on a solid content of 100 parts by weight of the carboxylic acid-modified nitrile-based copolymer latex.

5. The latex composition of claim 1, further comprising a sulfur component, a vulcanization accelerator, and a cross-linking agent,
   wherein the sulfur component is included in 0.8 parts by weight or less, the vulcanization accelerator is included in 0.6 parts by weight or less, and the cross-linking agent is included in 1.1 parts by weight or less, based on a solid content of 100 parts by weight of the carboxylic acid-modified nitrile-based copolymer latex.

6. The latex composition of claim 1, wherein the carboxylic acid-modified nitrile-based copolymer includes a conjugated diene-based monomer-derived repeating unit, an ethylenically unsaturated nitrile-based monomer-derived repeating unit, and an ethylenically unsaturated acid monomer-derived repeating unit.

7. A cross-linked polymer comprising:
   two or more parts derived from a carboxylic acid-modified nitrile-based copolymer;

a part derived from a reactive compound having three or more branched chains and a reactive group at a terminal of each of the three or more branched chains; and a cross-linking part formed by cross-linking a carboxylic acid group included in the carboxylic acid-modified nitrile-based copolymer and the reactive group included in the reactive compound, wherein each of the three or more branched chains included in the reactive compound comprises a repeating unit represented by Formula 1,

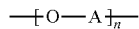

[Formula 1]

wherein A is an alkylene group having 2 to 5 carbon atoms, and n is an integer of 150 to 250.

8. A method of preparing a latex composition for dip molding, the method comprising:

step S10: emulsion-polymerizing a monomer mixture including a conjugated diene-based monomer, an ethylenically unsaturated nitrile-based monomer, and an ethylenically unsaturated acid monomer to obtain a carboxylic acid-modified nitrile-based copolymer latex; and step S20: selectively adding a sulfur component, a vulcanization accelerator, and a cross-linking agent in the presence of the obtained carboxylic acid-modified nitrile-based copolymer latex, wherein a reactive compound having three or more branched chains and a reactive group at a terminal of each of the three or more branched chains is added in the step S10, the step S20, or both the step S10 and the step S20, wherein each of the three or more branched chains included in the reactive compound comprises a repeating unit represented by Formula 1,

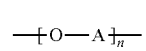

[Formula 1]

wherein A is an alkylene group having 2 to 5 carbon atoms, and n is an integer of 150 to 250.

9. The method of claim 8, wherein the reactive compound is added in an amount of 0.1 parts by weight to 5 parts by weight, the sulfur component is added in an amount of 0.8 parts by weight or less, the vulcanization accelerator is added in an amount of 0.6 parts by weight or less, and the cross-linking agent is added in an amount of 1.1 parts by weight or less, based on a solid content of 100 parts by weight of the carboxylic acid-modified nitrile-based copolymer latex.

10. The method of claim 8, wherein the reactive compound added in the step S10 is added to the monomer mixture, to the obtained carboxylic acid-modified nitrile-based copolymer latex, or to both the monomer mixture and the obtained carboxylic acid-modified nitrile-based copolymer latex.

11. The method of claim 8, wherein the cross-linking agent is zinc oxide or titanium oxide.

12. A dip-molded article comprising a layer derived from the latex composition for dip molding of claim 1.

* * * * *